E. S. BRYANT.
STEERING WHEEL.
APPLICATION FILED AUG. 23, 1907.

920,018.

Patented Apr. 27, 1909.

WITNESSES:
Walter A. Greenburg.
Anna M. Dorr.

INVENTOR:
ELLSWORTH S. BRYANT.

BY

ATTORNEYS.

UNITED STATES PATENT OFFICE.

ELLSWORTH S. BRYANT, OF DETROIT, MICHIGAN, ASSIGNOR TO PATRICK L. HUSSEY, OF CLEVELAND, OHIO.

STEERING-WHEEL.

No. 920,018.  Specification of Letters Patent.  Patented April 27, 1909.

Application filed August 23, 1907. Serial No. 389,788.

*To all whom it may concern:*

Be it known that I, ELLSWORTH S. BRYANT, a citizen of the United States of America, residing at Detroit, in the county of Wayne and State of Michigan, have invented certain new and useful Improvements in Steering-Wheels, of which the following is a specification, reference being had therein to the accompanying drawings.

In the construction of steering wheels for automobiles, power boats, and the like, it is customary to form the wheels with a central spider of metal in which the hubs and spokes are integral, or are rigidly connected, and which is usually of special design to carry throttling and controlling levers, and to provide a hand hold or grip in the form of a rim of laminated wood or other suitable material, secured to the spider. Owing to the expansion and contraction of the spider from changes in temperature, as well as to the strains and vibrations to which it is subjected, the rim frequently splits and checks, or works loose in time, and rattles.

This invention relates to a form of construction which permits the use of any spider or hub and spoke construction required for any particular purpose, and furnishes a rim which withstands slight distortion of the spider without checking or splitting, which does not jar loose and rattle, and which, while light, and agreeable to the touch, is extremely durable and strong.

The invention consists in the matters hereinafter set forth, and more particularly pointed out in the claims.

Figure 1:
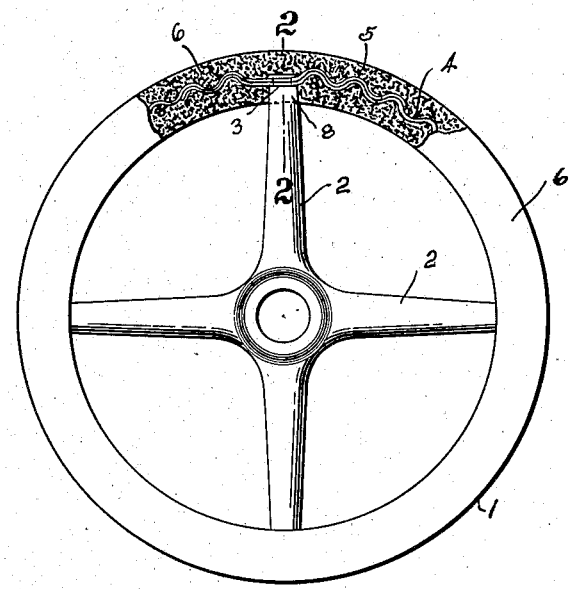
Figure 2:
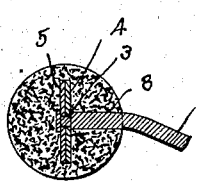
Figure 3:
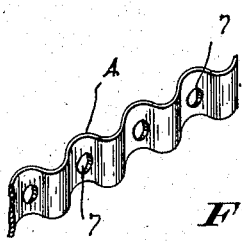

Referring to the drawings, Figure 1 is a plan view of a steering wheel, with parts broken away, showing a preferred form of construction which embodies the features of the invention. Fig. 2 is a view in section through the rim of the wheel, on line 2—2 of Fig. 1. Fig. 3 is a view showing the details of construction of a metal ring used as a core for the rim.

In the drawings, 1 represents a metal spider of any design required by the use for which the wheel is intended, having a number of arms or spokes 2. In a preferred rim construction the ends of the spokes are squared off to present tangential faces 3. A perforated loop or band 4 of thin sheet metal transversely corrugated, is secured against the ends 3 of the spokes, the registering of the corrugations of the overlaid end portions 5 forming a comparatively thin, smooth lap joint. This core or band is surrounded by or embedded in a body 6 which is molded or otherwise formed in place while plastic, so that it extends through and through the perforations 7 in the band and completely envelops it save where the spokes 2 enter, the covered portions 8 of the latter being preferably reduced in cross-section. The exterior of the body is suitably rounded for the hand. As the sheet metal core is radially flexible or elastic, the expansion or contraction of the spider does not affect it as a whole, and therefore does not split the rim. Furthermore, the corrugations securely anchor the rim body in place, because, in case the body and rim do work loose locally or at different points, the corrugation of the band, which, since it is formed of a straight bar bent into a hoop without permanent set, is under slight spring tension, tend, when released from pressure, to elongate, and always bear against the body so that there is no jar or rattle. Because of the character of the mass of the body, the rim does not check or split, as does a laminated or built up rim. In addition, there is no danger of detachment of the rim and spider, as the metal fastening members are inclosed and locked by the body against working out. The exterior is smooth with no projecting rivet or screw heads.

When an extremely light wheel is desired, the metal strip may be replaced by ratan or like resilient material.

The design and form of the parts may be changed without departing from the spirit of the invention, and I do not intend to limit myself to any particular form or arrangement of parts.

I claim as my invention:—

1. A steering wheel comprising a central spider with outwardly extending arms, a thin, perforated strip of sheet metal transversely corrugated, bent into a circle, with overlaid ends whose corrugations register and form a lap joint, secured on the arms, and a rim body of material, enveloping the strip and passing through and through the perforations.

2. A steering wheel comprising a central spider with outwardly extending arms, a thin, perforated strip of sheet metal, transversely corrugated, bent into a circle, and secured against the peripheral faces of the arms, and a body of material, surrounding the strip and end portions of the arms, and passing through and through the apertures.

3. A steering wheel comprising a central spider having outwardly extending arms, a thin, perforate strip of sheet metal, transversely corrugated, bent into a circle, and secured to the outer ends of the arms, and a body of material, enveloping the strip and adjacent end portions of the arms, and passing through and through the perforations, the end portions of the arms so enveloped being reduced in cross-section.

4. A steering wheel comprising a central spider having outwardly extending arms, a thin, perforate strip of sheet metal, transversely corrugated, bent into a circle, the corrugations of the overlaid ends of the strip being brought into register to form a smooth lap joint, and secured to the outer ends of the arms, and a body of material, enveloping the strip and adjacent end portions of the arms, and passing through and through the perforations, the end portions of the arms so enveloped being reduced in cross-section.

5. A steering wheel comprising a central spider having outwardly extending arms, a thin, perforate strip of sheet metal, transversely corrugated, bent into a circle, the corrugations of the overlaid ends of the strip being brought into register to form a lap joint, and secured to the outer ends of the arms, and a body of material, enveloping the strip and adjacent end portions of the arms, and passing through and through the perforations.

In testimony whereof I affix my signature in presence of two witnesses.

ELLSWORTH S. BRYANT.

Witnesses:
    ANNA M. DORR,
    C. R. STUKNEY.